Figure 1:
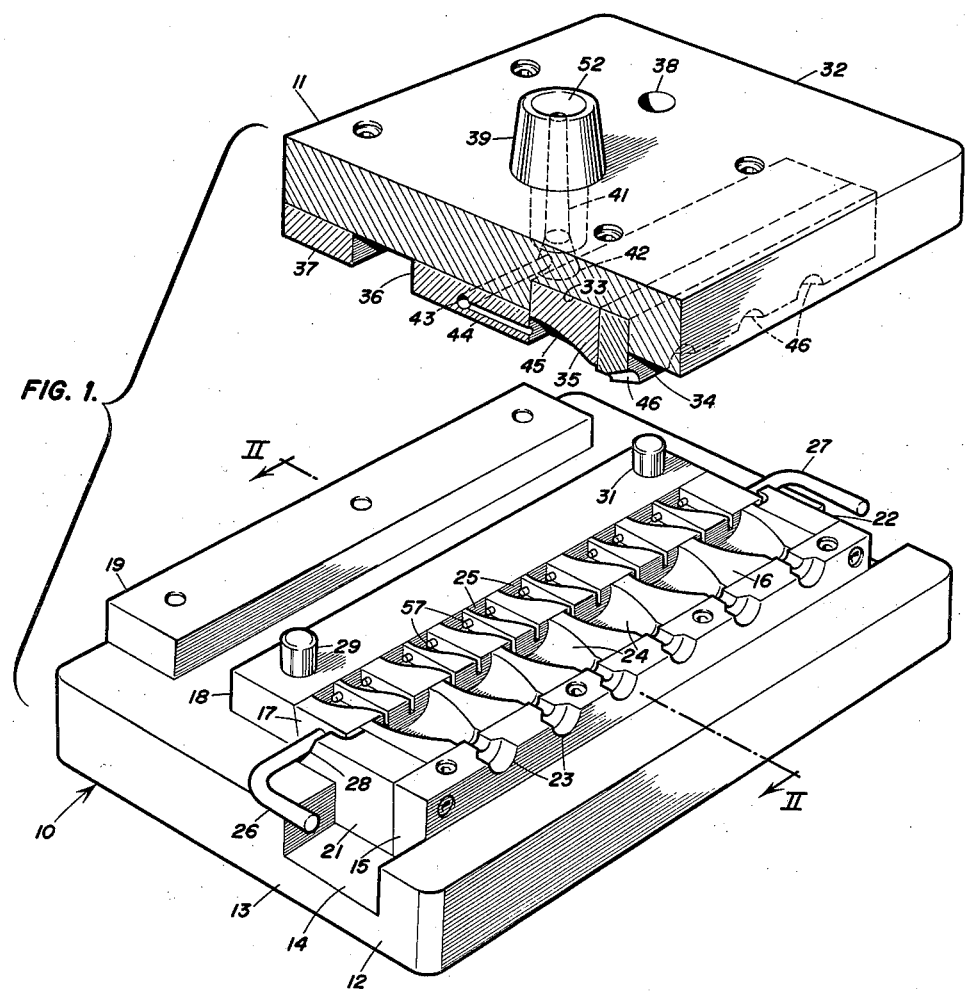

Oct. 29, 1963  C. T. KELLEHER  3,108,328
DIE
Filed Sept. 25, 1961  2 Sheets-Sheet 1

CORNELIUS T. KELLEHER
INVENTOR

BY Norman S. Blodgett
ATTORNEY

Oct. 29, 1963  C. T. KELLEHER  3,108,328
DIE
Filed Sept. 25, 1961  2 Sheets-Sheet 2
FIG. 2.
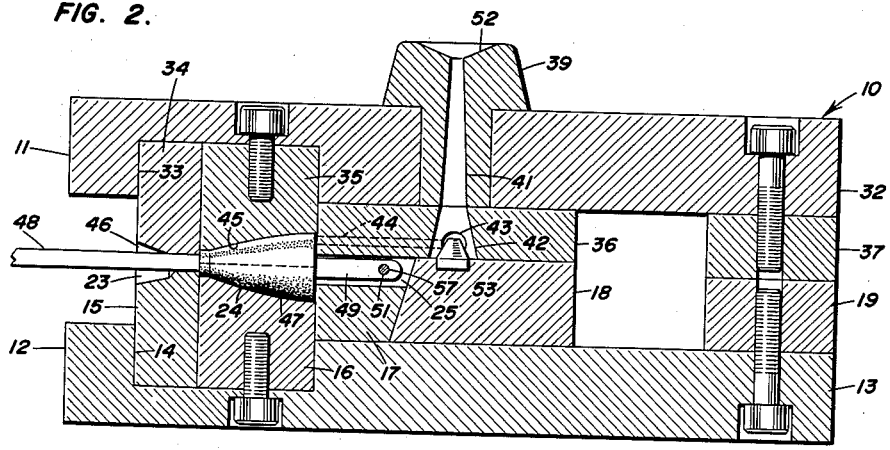
FIG. 3.
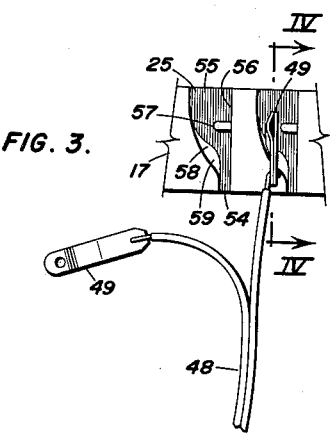
FIG. 4.
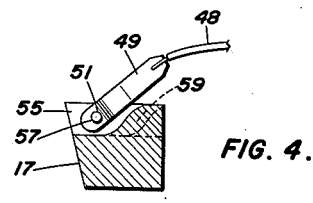
FIG. 6.
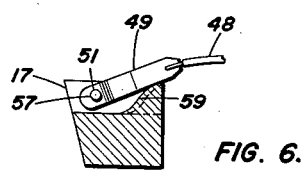
FIG. 5.
FIG. 7.
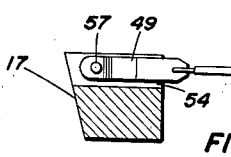
CORNELIUS T. KELLEHER
INVENTOR
BY Norman S. Blodgett
ATTORNEY United States Patent Office 3,108,328
Patented Oct. 29, 1963

3,108,328
DIE
Cornelius T. Kelleher, Holden, Mass., assignor to Progressive Tool & Die Co., Shrewsbury, Mass., a corporation of Massachusetts
Filed Sept. 25, 1961, Ser. No. 140,512
7 Claims. (Cl. 18—36)

This invention relates to a die and more particularly to apparatus arranged to mold a plug on the end of an extension cord.

It is common practice to form the plug on the end of an extension cord by first attaching the prongs or blades to the ends of the wires and, then, placing the blades in the cavity of an injection molding machine while molten plastic material is formed around the blades and wires. In a common type of injection molding machine the lower die remains fixed on its table and the upper die is moved up and down for the removal of the finished product and insertion of new wires and blades. In most cases, a considerable number of plugs are molded in one operation. The blades are locked in a removable bar which is inserted in a suitable groove in the lower mold; the plugs are molded around the blades as they are held in one such clamping bar, while another set of blades and wires are being inserted by the operator in another clamping bar. It can be seen, therefore, that the length of the cycle through which the injection molding machine passes is determined mainly by the time required for the operator to remove finished plugs from the clamping bar which is not in the machine and to insert new wires and blades in preparation for the next molding operation. The prior art clamping bars consist of an elongated member having a large number of slots, one for each blade, and a long rod running lengthwise of the member through the slots. The blades are inserted successively into the slots from one end to the other of the member, and the locking rod is pushed further and further through the bar to engage the aperture in the blade as each blade is placed in its respective slot. The process of placing the blades one by one in their slots and moving the locking rod through the length of the bar as the blades are inserted is a tedious and time-consuming operation. These and other difficulties experienced with the prior art devices have been obviated in a novel manner by the present invention.

It is, therefore, an outstanding object of the invention to provide a die for use in an injection molding machine in molding a plug around the blades of an extension cord wherein the loading of the die is expedited.

Another object of this invention is the provision of a clamping bar for holding the blades of an extension cord in an injection molding machine in which the blades may be inserted and held very quickly and there are no moving parts.

A further object of the present invention is the provision of a removable clamping bar for an injection molding machine for holding perforated metallic members which are to be incorporated in a molded plastic article.

It is another object of the instant invention to provide a clamping bar for quickly inserting and holding a plurality of perforated metallic articles in a plastic-molding die.

It is a further object of the invention to provide a clamping bar capable of quickly locking in place a perforated blade of an extension cord plug.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which:

FIG. 1 is a perspective view in open condition of a die incorporating the principles of the present invention;
FIG. 2 is a vertical sectional view of the die in closed condition taken on the line II—II of FIG. 1;
FIG. 3 is a plan view of a portion of the invention during operation;
FIG. 4 is a vertical sectional view taken on the line IV—IV of FIG. 3;
FIG. 5 is a plan view of a portion of the invention taken during another part of the operation;
FIG. 6 is a vertical sectional view taken on the line VI—VI of FIG. 5; and
FIG. 7 is a vertical sectional view of the invention after the operation has been completed.

Referring first to FIG. 1, wherein are best shown the general features of the invention, the die, indicated generally by the reference numeral 10, is shown as consisting of an upper portion 11 and a lower portion 12. The lower portion 12 consists of a thick plate 13 across which a rectilinear groove 14 has been formed. In this groove resides a guide bar 15 and a molding portion 16. On the upper surface of the plate 13 and residing against the molding portion 16 is a holding portion such as a clamping bar 17 at the rear of which is located a bar 18. Also mounted on the upper surface of the plate 13 rearwardly of the bar 18 is a supporting bar 19. At one end of the molding portion 16 is a locking block 21 and a similar locking block 22 is provided at the other end. The guide bar 15 is provided with grooves 23 and the molding portion 16 is provided with cavities 24 which are shaped to give the form of an electrical terminating plug. The clamping bar 17 is provided with a plurality of slots 25; in the preferred embodiment there are two of these slots for each of the plug cavities 24 to take care of the fact that the average electrical terminating plug has two blades. From one end of the clamping bar 17 extends a fixed handling rod 26 and at the other end another fixed handling rod 27. The handling rod 26 resides in a cradle 28 formed in the locking block 21, while the handling rod 27 rests in a similar cradle on the locking block 22. Extending vertically up from the bar 18 are guide pins 29 and 31.

Referring now to the upper portion 11, it can be seen that it consists of a plate 32 of exactly the size and shape as the plate 13 of the lower portion. It is also provided with a rectilinear groove 33 which faces downwardly in opposition to the groove 14 in the lower portion. In the groove 33 is fastened a guide bar 34 and a molding portion 35, these being arranged to match the guide bar 15 and the molding portion 16 of the lower portion 12, respectively. Rearwardly of the molding portion 35 is a feed bar 36; spaced from and located rearwardly of the feed bar 36 is a supporting bar 37 adapted to engage and exactly match the supporting bar 19 of the lower portion 12. Extended through the feed bar 36 and the plate 32 is a bore 38 into which the guide pin 31 is adapted to extend. A similar bore (not shown) is provided to engage the guide pin 29. Mounted on the plate 32 is an injection guide 39 having a bore 41. A bore 42 through the feed bar 36 acts as an extension of the bore 41 and is provided with a feed passage 43 leading to a lateral passage 44 which opens on a mold cavity 45 formed in the molding portion 35. A groove 46 is formed in the downwardly-directed surface of the guide bar 34 to match each of the grooves 23 in the guide bar 15 of the lower portion.

Referring now to FIG. 2, the die 10 is shown in closed condition with the upper portion 11 resting on the lower portion 12. At the rear side, the supporting bar 37 of the upper portion rests on the supporting bar 19 of the lower portion. At the front side, the guide bar 34 rests on the guide bar 15. The molding portion 35 overlies and rests on the molding portion 16, and the feed bar 36 rests on both the holding portion 17 and the bar 18. Each groove 46 in the guide bar 34 matches and forms a complete enclosure with a groove 23 on the guide bar 15. In a similar manner each cavity 45 in the molding portion 35 matches a cavity 24 on the molding portion 16 so as to form a complete cavity for the electrical plug. The plug 47, incidentally, is shown in FIG. 2 in place within the cavity and from one side, extending through the grooves 46 and 23, is the wire. From the other side of the plug extends a blade 49 having, as is usual, an aperture 51. The blade lies in the slot 25 formed in the holding portion 17. As is evident in the drawing, the injection guide 39 is provided with a spherical cavity 52 formed to fit an injection nozzle and the bore 41 is tapered so that its lower end is larger at the lower end. This lower end matches the upper end of the bore 42 in the feed bar 36. A small truncated cone 53 extends upwardly from the bar 18 and is located centrally of the bore 42 to regulate the flow of plastic. Extending from the bore 42 is the passage 43 from which extends the lateral passages 44 leading to the cavities 45. It can be seen in this view that the forward vertical surfaces of the holding portion 17 and the feed bar 36 form a vertical plane surface which forms the surface of the plug 47 from which the blades 49 extend. It may also be noted that the clamping bar 17 is provided with a rear inclined surface which matches a correspondingly inclined forward surface of the bar 18. This arrangement serves to draw the bar 17 snugly against the rear surface of the molding portion 16. As is evident in the drawing, the parting line or horizontal plane between the lower surface of the feed bar 46 on the one hand and the upper surfaces of the clamping bar 17 and the bar 18 on the other hand is on a level slightly higher than the parting line between the guide bar 34 and the molding portion 35 on the one hand and the guide bar 15 and the molding portion 16 on the other hand.

The particular formation of the slots 25 of the clamping bar 17 can be seen clearly in FIG. 3. The slot 25 consists of a narrow portion 54 connected with the cavity 24 and a rearwardly-directed wide portion 55 whose rear end is closed off by the forward surface of the bar 18. One vertical surface 56 forms a common wall for both slots and a pin 57 extends from this wall into the wide portion halfway between the bottom and the upper edge thereof. The narrow portion 54 and the wide portion 55 are joined by a curved transition surface 58 which is provided with a bevel 59. It should be noted that the pin 57 extends from the wall 56 a greater distance than the width of the narrow slot 54.

The operation of the invention will now be readily understood in view of the above description. The clamping bar 17 is removed from the lower portion 12 of the die by grasping the handling rods 26 and 27 and pulling upwardly. This separates the inclined surfaces of the bar 17 and the bar 18; of course, this can only be done when the die is separated, as shown in FIG. 1. When the die is closed, as shown in FIG. 2, the feed bar 36 presses downwardly on the clamping bar 17 and keeps it in place. The clamping bar 17 is removed from the die and lying on the table in front of the operator. He grasps the extension cord wire 48 and holds it by one of the blades 49. As is shown in FIG. 3, each blade is formed to give a slight spring action when it is inserted into an electrical receptacle; the springiness is in the lateral direction and is formed in many cases by two sheets of metal welded together at the outer end and one or both of them bowed slightly away from each other. The outer end of the blade 48 (having the aperture 51) is inserted into the wide slot 55 laterally of the pin 57 with the intermediate part of the blade resting on the bevel 59, forming part of the transition surface 58. This is the condition shown in FIGS. 3 and 4. The next step in the operation is shown in FIGS. 5 and 6; the operator moves the blade 49 laterally toward the pin 57 and at the same time bears down with the intermediate portion of the blade on the transition surface 59, thus camming the blade laterally so that the pin 57 extends through the aperture 51 in the blade. Finally, as shown in FIG. 7, the blade is pressed downwardly pivoting about the pin 57 until the action of the transition surface and the bevel 59 force it downwardly into the narrow portion 54. The lateral resilience of the blade 49, caused by the bowing of its separate parts, causes it to jam tightly into the narrow portion 54 and this combines with the action of the pin 57 to lock the blade 49 firmly in place. After all of the extension cords and their blades have been inserted in the clamping bar 17, it is lowered onto the lower portion 12 of the die. The wires 48 extending away from the blades 49 pass through the grooves 23 in the guide bar 15 and the soldered connection between the wire 48 and the blade 49 lies within the cavity 24 in the molding portion 16. When the upper portion 11 of the die is lowered into place by means of alignment between the pins 29 and 31 and the apertures 38, the injection molding machine is operated in the usual way with molten plastic flowing through the bore 41 and the bore 42 to the passage 43 and through the lateral passage 44 to the cavities 24 and 45. The plastic flows around the soldered junction between the wires 48 and their blades 49 to form the plug 47. While this operation is taking place automatically, the other clamping bar 17 is being loaded with blades 49 and wires 48 in the manner that has just been described. When the molding operation is over and the upper portion of the die is lifted, the cavities 24 are stripped; that is to say, by pulling on the wires 48, the plugs 47 come out of the cavities 24, but they remain connected to the clamping bar because they are locked therein by the engagement of the blades with the pins 57. As soon as the plugs have been loosened in the cavities 24, it is possible for the operator to lift the clamping bar 17 clear of the die and to place it to one side and to replace it with the other clamping bar, carrying the next set of cords on which plugs are to be molded. Once the clamping bar 17 has been removed from the die and the injection molding cycle starts with a new set of cords, the operator is at leisure to remove the plugs and wires and blades entirely from the clamping bar 17 which is not in the machine. He does this by lifting upwardly on each blade 49 and then moving it laterally to the left, thus, in effect, reversing the operation which was used to insert them in the slots in the first place.

It can be seen that the operation of inserting a blade in the slot and locking it in place can, with a little practice, take place very rapidly, and it can be accomplished with one hand. It is not necessary to use the other hand to insert a locking rod or similar mechanism as was used in the past. For that reason, since only one hand is needed to insert and lock the blade in the slot, the other hand can be grasping another wire or performing some operation preparatory to putting a blade in a slot.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A die for use in an injection molding machine in molding plugs around the blades of extension cords, comprising a molding portion having plug cavities formed therein, a groove extending beside the molding portion and having a trapezoidal cross-sectional form, a holding portion having a trapezoidal cross-sectional form similar to that of the said groove and having at least one slot opening on each cavity of the molding portion, and independent means in the slot for holding a blade therein.

2. A die for use in an injection molding machine for molding plastic plugs around the apertures in metallic blades of extension cords, comprising a molding portion having plug cavities formed therein, a holding portion providing a substantial portion of the plug cavity surface and having at least one slot opening on each cavity of the molding portion, and independent means including a pin in the slot for holding a blade therein.

3. A die for use in an injection molding machine in molding plastic plugs around the apertured metallic blades of extension cords, comprising a molding portion having plug cavities formed therein, a holding portion having at least one slot including a narrow portion opening on each cavity of the molding portion and a wide portion away from the said cavity, a transition bevel joining the surfaces of the narrow and wide portions, and independent means including a pin in the slot for holding a blade therein.

4. A die for use in an injection molding machine for forming plastic plugs around the apertured metallic blades of extension cords, comprisnig a molding portion having plug cavities formed therein, a removable holding portion having at least one slot including a narrow portion opening on a cavity of the holding portion and a wide portion located away from the said cavity, a transition bevel joining the surfaces of the narrow and wide portions, and a horizontal pin in the wide portion of the slot for extending through the aperture and locking the blade in the slot.

5. A die as recited in claim 4 wherein the narrow and wide portions of the slot have a common plane vertical wall surface from which the pin extends, the pin extending a distance greater than the width of the narrow portion, the transition bevel lying in opposition to the said vertical wall surface and the pin.

6. A die for use in an injection molding machine for forming plastic articles around apertured metallic elements, comprising a removable holding portion having at least one slot including a narrow portion adapted to open on a mold cavity and a wide portion adapted to be located away from the said cavity, a transition bevel joining the surfaces of the narrow and wide portions, the narrow and wide portions of the slot having a common plane wall surface, a pin located in the wide portion and extending from the wall surface a distance greater than the width of the narrow portion, the transition bevel lying in oppositon to the said vertical wall surface and to the pin, the pin being adapted to extend through the aperture and to lock the metallic element in the slot.

7. A locking member for use in a machine for forming plastic articles around apertured metallic elements, comprising at least one slot including a narrow portion and a wide portion connected thereto by a transition portion, the narrow and wide portions of the slot having a common plane wall surface, a pin located in the wide portion and extending from the said wall surface a distance greater than the width of the narrow portion, the transition portion including a bevel lying in opposition to the said wall surface and to the pin, the pin being adapted to extend through the aperture in the metallic element and to lock it in the slot.

References Cited in the file of this patent
UNITED STATES PATENTS
1,973,117    Sklar ------------------ Sept. 11, 1934